United States Patent [19]

Lytle

[11] Patent Number: 4,464,671
[45] Date of Patent: Aug. 7, 1984

[54] UNIVERSAL SLIP-ON MOUNTING FOR DISPOSABLE CHART PENS

[76] Inventor: William F. Lytle, Knight La., Orange, Conn. 06477

[21] Appl. No.: 385,239

[22] Filed: Jun. 4, 1982

[51] Int. Cl.³ .............................................. G01D 15/16
[52] U.S. Cl. ............................................... 346/140 A
[58] Field of Search .................................... 346/140 A

[56] References Cited

U.S. PATENT DOCUMENTS

| 1,895,727 | 1/1933 | Pearce | 346/140 A |
| 3,893,130 | 7/1975 | Browning et al. | 346/140 A |
| 3,934,255 | 1/1976 | Taylor | 346/140 A |
| 4,024,547 | 5/1977 | Raahauge | 346/140 A |

Primary Examiner—George H. Miller, Jr.
Attorney, Agent, or Firm—H. Gibner Lehmann; K. Gibner Lehmann

[57] ABSTRACT

A universal slip-on pen cartridge device for attachment to the movable pen arm of chart recorders, has a molded plastic body with ink reservoir and stylus. The flat surface of the pen body has upstanding spaced-apart posts which secure in place by means of sonic welding a bridge member that has a shallow groove in its face which adjoins the pen body. A tunnel is thus formed with the pen body, into which the pen arm can be inserted, said arm having an aperture which accommodates a nib on the pen body to retain the parts in assembled relation.

16 Claims, 10 Drawing Figures

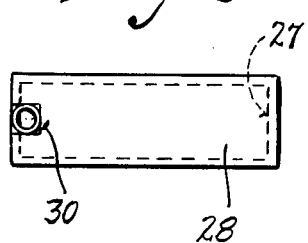
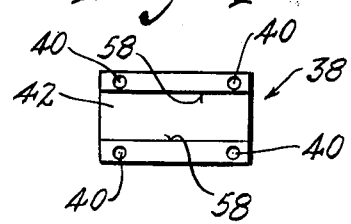
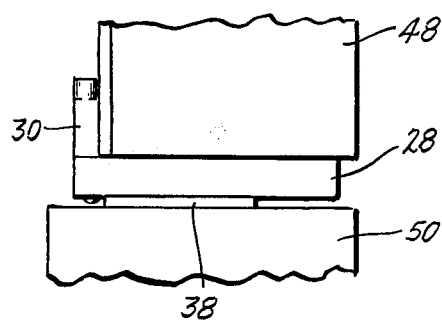
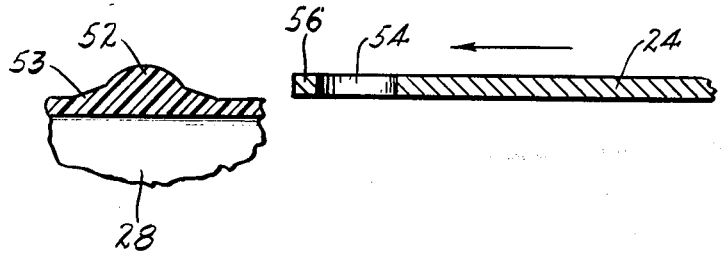
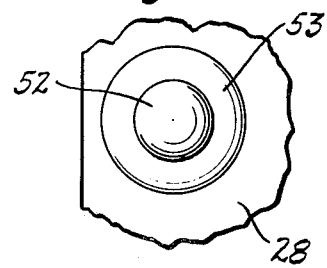

UNIVERSAL SLIP-ON MOUNTING FOR DISPOSABLE CHART PENS

BACKGROUND

This invention relates generally to pen cartridge devices adapted for use with industrial chart recorders, and more particularly to inexpensive, universally-applicable cartridges which are useable with various types of chart recorders and which are sufficiently low in cost that they can be disposed of after the intended period of use has expired.

Heretofore, various mounting arrangements have been proposed and produced, for enabling quick and easy demountable installation of a pen cartridge on the writing arm of a chart recorder. Usually such cartridges comprise an elongate hollow container which carries the ink, a stylus, and a means for attaching the container to the movable pen arm.

Some prior cartridges were provided with longitudinal grooves in the container body, adapted to receive the end portion of the pen arm. With these cartridges, close tolerances were necessary to enable the walls of the groove to properly frictionally grip and hold the side edges of the pen arm. Such tolerances had the disadvantage that the cost of the cartridge was undesirably increased, and also that slight variations in the widths of pen arms of different makes of recorders would defeat the purpose and negate the universality of the cartridge.

With other cartridge constructions, integral plastic lugs protruded from the surface of the cartridge body and were so spaced that the pen arm could be snapped or slipped into the spaces between, to secure assembly of the two parts. With this prior construction the lugs would sometimes break off, and also there existed the same disadvantage enumerated above for the grooved-type of cartridge body.

Moreover, in many cases the prior, replaceable pen cartridges were too difficult to install and remove. In consequence, bending or damage of the pen arm resulted, since such arms are usually constituted of a thin flat strip, usually of metal.

SUMMARY

The above drawbacks and disadvantages of prior pen cartridges are obviated by the present invention, which has for one object the provision of a novel and improved, universal disposable slip-on pen cartridge for attachment to the writing arms of different chart recorders, which is especially simple and economical in its construction.

Another object of the invention is to provide an improved universal slip-on pen cartridge as above characterized, which is particularly reliable in its operation and not likely to malfunction in use, nor to deform or damage the pen arm during its installation and removal.

Still another object of the invention is to provide a novel and improved universal slip-on pen cartridge as above set forth which is readily adaptable for use with a wide variety of recorders units.

Yet another object of the invention is to provide an improved pen cartridge in accordance with the foregoing, which can be easily and quickly installed and also removed by either a simple push or else a pull operation, and wherein the cartridge is automatically self orienting with respect to the pen arm.

A still further object of the invention is to provide an improved pen cartridge of the kind outlined above, wherein relatively few, simple molded plastic parts are utilized in an arrangement whereby they can be quickly and economically fabricated and assembled.

The above objects are accomplished by the provision of a cartridge in the form of a molded plastic pen body of hollow construction, containing an ink reservoir and a stylus carried thereby, the latter being adapted for engagement with the paper chart of a recorder. The pen body has a neck or hollow duct portion in which the stylus is carried, and has a substantially flat surface against which a corresponding flat part of the pen arm of the recorder can bear. Cooperable with the pen body is a bridge member which is fused thereto, the parts being so arranged as to form a tunnel or passage into which the pen arm can be inserted and secured. For this purpose, according to the specific embodiment of the invention illustrated herein, the flat surface of the pen body is provided with a plurality of upstanding, slender spaced-apart posts. The bridge member provided for disposition against the flat surface of the body, has positioning recesses which are occupied by the posts of the pen body. In the illustrated embodiment of the invention, the bridge member has a shallow groove which faces the pen body, thereby to provide with the body the said tunnel into which the pen arm can be easily slidably inserted. Portions of the pen body comprising the spaced-apart posts, and bridge member are fused together by sonic welding, to retain these parts in assembled relation. Cooperable detent means are provided on the pen arm and cartridge body, to yieldably hold the body on the arm under normal operating conditions.

Other features and advantages will hereinafter appear as the specific description of one illustrative embodiment, given below, is perused.

In the accompanying drawings, which show the present preferred embodiment of the invention:

FIG. 6 is a bottom plan view of the pen cartridge body, per se.

FIG. 7 is a plan view of the underside of a bridge member constituting a component of the assembled pen cartridge.

FIG. 8 is a diagrammatic representation showing, in side elevation, sonic-welding electrodes having disposed between them the pen cartridge with its parts positioned ready for permanent assemblage.

FIG. 9 is a fragmentary sectional view of the body of the cartridge in the vicinity of the nib, and showing the pen arm in section, as it approaches the nib during installation of the pen cartridge device on the pen arm.

FIG. 10 is a top plan view of the foremost portion of the cartridge, particularly showing the nib and a fillet surrounding the nib.

Figure 1:
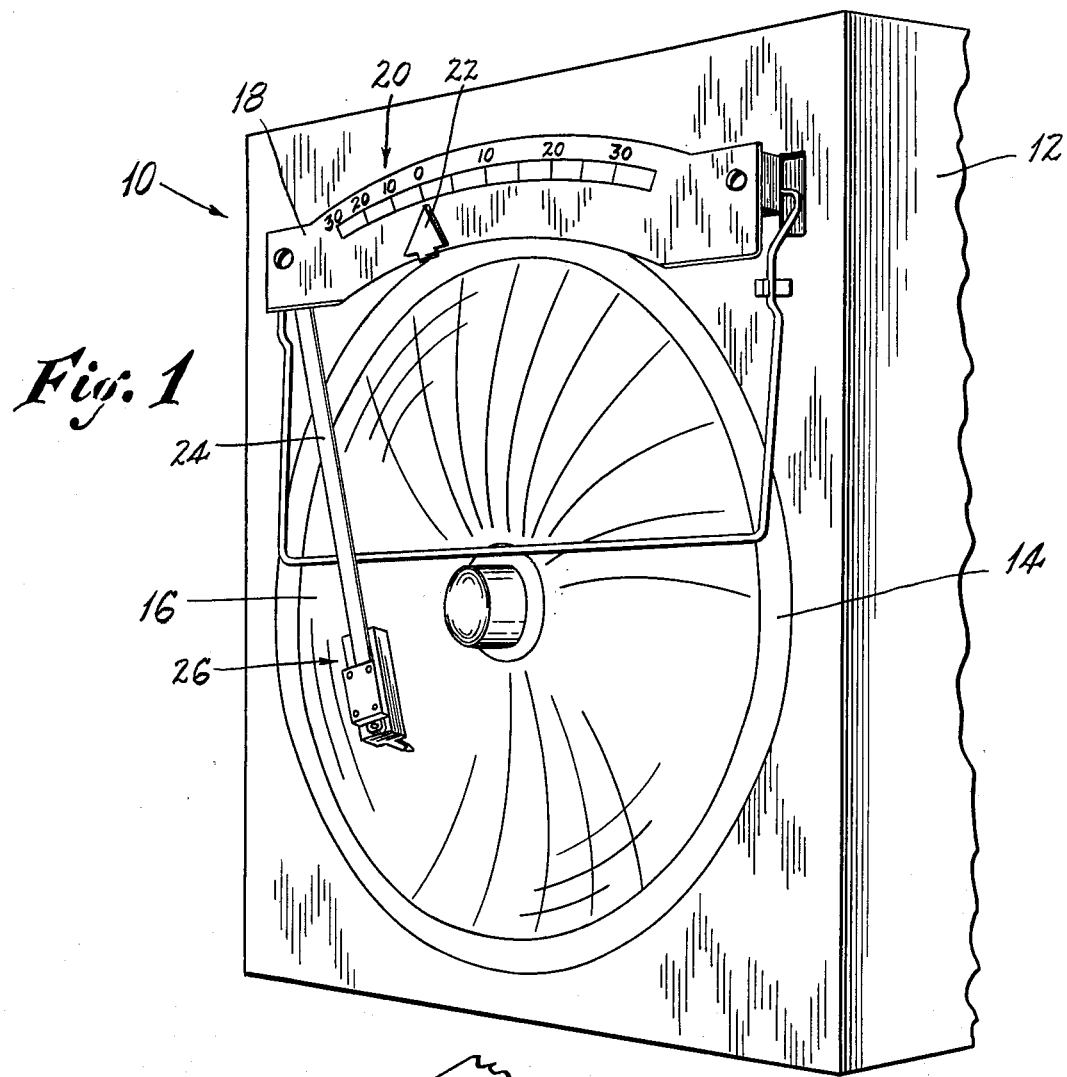
FIG. 1 is a perspective view of a chart recorder incorporating the improved, slip-on pen cartridge of the present invention.

Referring first to FIG. 1 there is shown a chart recorder designated generally by the numeral 10, having a housing 12 and a circular table 14 on which there is carried a paper chart disc 16. The recorder 10 can have a dial or indicia plate 18 provided with calibrated graduations 20. A pointer 22 is movable over the indicia plate 18 to indicate desired values of a quantity.

Pivotally carried by the housing 12 is a movable pen or writing arm 24 which usually comprises a thin flat strip of resilient metal, such arm mounting at its operating extremity a pen device or cartridge 26. The pen cartridge 26 is hollow, forming an ink reservoir which is designated by the broken outline 27 in FIG. 6.

The pen arm 24 can be driven by means of a servo mechanism, which can include suitable amplifier and driver circuitry (not shown) carried within the housing 12.

Referring to FIGS. 2–7, the present improved slip-on pen cartridge 26 as provided by the invention comprises a molded plastic pen body or body part 28 having a raised neck portion in the form of a ducted post 30, in which a porous stylus 32 is carried. Ink from the reservoir 27 can flow through the stem of the stylus 32, to be deposited on the chart paper 16 in the form of a line or graph. The pen body 28 has a flat surface 34 against which a corresponding flat part of the pen arm 24 can bear.

In accordance with the present invention, novel and improved low-cost means are provided to demountably secure the cartridge 26 on the pen arm 24, which means enables the cartridge to be easily and quickly either slipped on or pulled off the pen arm. In accomplishing this, the cartridge body 28 is uniquely coupled with and secured to a bridge member or part 38 in a novel manner, such bridge part being fabricated as a piece separate from the body part 28 and being disposed with a side thereof to be opposite the flat, supporting surface 34 of the body part.

One of said parts has elongate guide means in the surface which faces the other part, thereby to provide a tunnel as explained below, into which the open arm can be inserted.

The securement of the bridge part 38 to the body part 28 can be effected in various advantageous ways, according to the invention, to cause these parts to be fused to each other. With the preferred construction illustrated herein, the body part 28 is provided with a plurality of upstanding, slender spaced-apart posts 36, and there is provided for attachment to said posts the bridge member or part 38, which is constituted of molded plastic.

The bridge member 38 is disposed against the flat surface 34 of the cartridge body 28 and has recesses in the form of apertures 40 which are occupied by the posts 36. Further, the bridge part 38 can have a shallow groove 42 provided in that surface of the part which faces the cartridge body 28, thereby to provide with such body a tunnel designated 44 in FIG. 2. Into the tunnel 44 the pen arm 24 can be easily, slidably inserted. Portions of the slender posts 36 of the pen body 28 are permanently fused to the bridge member 38 by sonic welding, to retain the bridge member in its operative position shown, such fusing being quickly and economically executed by such process.

FIG. 8 shows sonic welding electrodes 48, 50 between which there is disposed an assembled cartridge body 28 and bridge member 38. Upon the application of suitable electronic energy to the electrodes 48, 50 the fusing of the posts 36 to the bridge member 38 is very quickly carried out without damage or deformation to the body 28 or bridge member 38.

Figure 2:
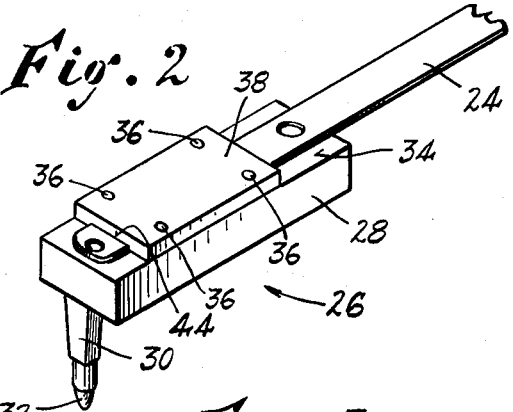
FIG. 2 is a fragmentary perspective view, showing the working end of the pen arm and top portions of the slip-on cartridge. The cartridge is operably mounted on the arm.
Figure 3:
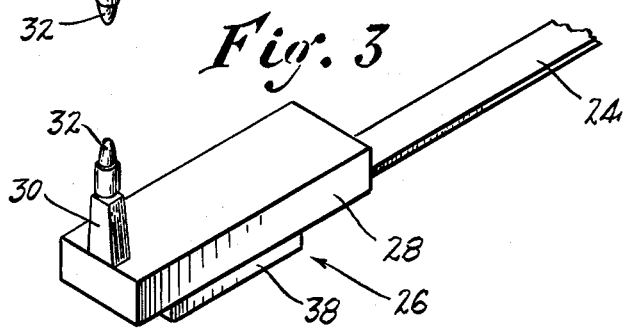
FIG. 3 is a perspective view somewhat like that of FIG. 2, but revealing the underside portions of the slip-on cartridge.
Figure 4:
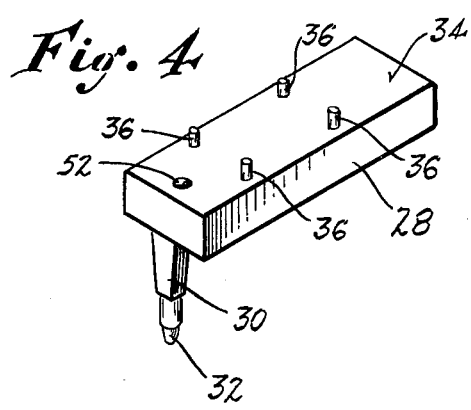
FIG. 4 is a top perspective view of the pen cartridge body, per se.
Figure 5:
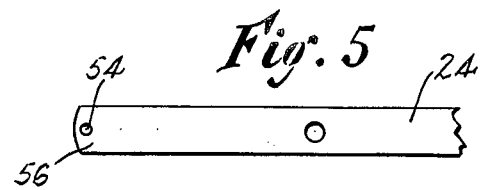
FIG. 5 is a fragmentary top plan view of the free end or pen-carrier portion of the pen arm.

Further, in accordance with the invention, cooperable means are provided to yieldably retain the resilient pen arm 24 in its operative position, supporting the pen cartridge 26 as viewed in FIGS. 2 and 3, while still enabling the easy and quick slipping on or pulling off of said cartridge. Such means in the preferred embodiment of the invention illustrated herein, comprises a nib 52 on the body 28 of the cartridge and a corresponding recess or aperture 54 at the extremity of the pen arm 24. The nib 52 can occupy the aperture 54, functioning as a detent thereby. Due to the resilience of the pen arm 24, the latter can be readily pulled out of engagement with the cartridge by virtue of the extremity 56 flexing slightly to dislodge the nib 52 from the aperture 54. As easily, the pen arm 24 can be inserted in the tunnel 44 of the cartridge with the aperture 54 of the arm accommodating the nib 52, as can be understood.

The shallow groove 42 of the bridge member 38 has oppositely-disposed longitudinal shoulders 58 adapted for engagement with the side edges of the pen arm 24 and constituting a guide means, to hold the cartridge 26 properly oriented with respect to the arm. The shoulders 58 can be spaced apart a sufficient distance to accommodate variations in the widths of the pen arms, yet they will effectively orient the cartridge due to their relatively long lengths. As can be readily seen, portions of the bridge part 38 constitute a continuous and uninterrupted span across the guide means such that the body part and bridge part, when assembled, completely and fully surround the pen arm thereby to accurately position the body part on the pen arm.

Further in accordance with the present invention, means are provided for guiding the leading edge or extremity 56 of the pen arm 24 as it approaches the nib 52, and preventing the latter from being inadvertently sheared off by this leading edge, said means being in the form of a conical fillet 53 which is integral with and surrounds the nib 52, and which provides a ramp or sloping surface over which the end of the pen arm 24 can ride during assembly of the cartridge onto the arm. FIGS. 9 and 10 show the nib 52 and the fillet 53, with FIG. 9 particularly illustrating the appoach of the extremity 56 of the pen arm 24. As the arm 24 arrives at the location of the nib 52, it first rides up the ramp 53, and then passes over the nib 52 such that the latter is received in the opening 54 of the arm. The above arrangement has been found to provide a satisfactory retention of the cartridge, while at the same time minimizing or eliminating the possibility of the arm shearing off the nib 52 during assembly. If such shearing were to occur, it could defeat the proper functioning of the pen and lead to erratic recorder operation, or permit undesirable shifting of the cartridge while the recorder was in use. The present construction effectively overcomes this problem.

In accordance with the present invention the pen body 28 can be standardized to a great extent, except for the provision of the posts 36 which latter can be omitted for special circumstances, or replaced with a different type of positioning means (not shown).

The concept of the present invention, in its broader aspects embraces the provision of a plastic bridge part which is separate from the plastic body part and fused thereto on both of the opposite sides of the guide means, with the aid of suitable positioning means, and wherein these parts are configured to provide a tunnel for receiving the pen arm of the recorder, and to establish a yieldable detent with such arm. Different types of bridges can be used with a standardized body part of the above purpose, whereby a desirable universal characteristic is had by the slip-on pen device.

The preferred arrangement of positioning means for the parts, guide means for the pen arm, and detent means are shown as illustrative and not shown in a restrictive sense.

It can now be seen that I have provided an improved and simplified, easily mounted and dismounted, universal slip-on ink cartridge for chart-type recorders which is particularly economical to produce, reliable in its operation, and adaptable to a wide variety of chart-recorder equipment.

Each and every one of the appended claims defines a distinct aspect of the invention separate from all others, and accordingly each claim is intended to be treated in this manner in any determination of novelty or validity.

Variations and modifications are possible without departing from the spirit of the invention.

I claim:

1. A universal slip-on pen cartridge device for attachment to the movable pen arm of chart recorders, comprising in combination:
   (a) a molded plastic pen body part containing an ink reservoir and a stylus carried thereby, which latter is adapted for engagement with the paper chart of the recorder,
   (b) said body part having a hollow neck on which the stylus is carried, and having a supporting surface against which a corresponding flat part of the pen arm of the recorder can bear,
   (c) a bridge part fabricated as a piece separate from said body part, said bridge part being disposed with a side thereof located opposite to the supporting surface of the body part,
   (d) one of said parts having elongate guide means in that surface which faces the other part, thereby to provide a tunnel into which the pen arm can be inserted,
   (e) portions of said body part and bridge part being fused together on both of the opposite sides of the guide means, to retain the bridge part positioned on the body part, and
   (f) means on one of said parts, cooperable with the pen arm of a chart recorder, for yieldably retaining the fused-together bridge and body parts on said arm in operative position,
   (g) portions of said bridge part constituting a continuous and uninterrupted span across said guide means such that body part and bridge part, when assembled, completely and fully surround the pen arm thereby to accurately position the body part on the pen arm of the recorder.

2. A slip-on pen cartridge device as defined in claim 1, and further including:
   (a) a pen arm of a chart recorder, disposed in said tunnel thereby to mount the pen body part on the arm,
   (b) said yieldable retainer means comprising a portion of the pen arm.

3. A slip-on pen cartridge device as defined in claim 1, wherein:
   (a) the said yieldable retainer means comprises a nib engageable with the pen arm to retain the latter in operative position when it occupies the said tunnel.

4. A slip-on pen cartridge device as defined in claim 3, and further including:
   (a) a flat pen arm of a chart recorder,
   (b) said pen arm having a recess, in which the said nib is accommodated.

5. A slip-on pen cartridge device as defined in claim 1, wherein:
   (a) the said guide means comprises a shallow groove in said one part.

6. A slip-on pen cartridge device as defined in claim 2, wherein:
   (a) the shallow groove of the guide means has shoulders adapted for engagement with edge portions of the pen arm to effect a positioning of the latter.

7. A slip-on pen cartridge device as defined in claim 2, wherein:
   (a) the shallow groove is disposed in the bridge part.

8. A universal slip-on pen cartridge device for attachment to the movable pen arm of chart recorders, comprising in combination:
   (a) a molded plastic pen body part containing an ink reservoir and a stylus carried thereby, which latter is adapted for engagement with the paper chart of the recorder,
   (b) said body part having a hollow neck on which the stylus is carried, and having a supporting surface against which a corresponding flat part of the pen arm of the recorder can bear,
   (c) a bridge part fabricated as a piece separate from said body part, said bridge part being disposed with a side thereof located opposite to the supporting surface of the body part,
   (d) one of said parts having guide means in that surface which faces the other part, thereby to provide a tunnel into which the pen arm can be inserted,
   (e) portions of said body part and bridge part being fused together to retain the bridge part positioned on the body part, and
   (f) means on one of said parts, cooperable with the pen arm of a chart recorder, for yieldably retaining the fused-together bridge and body parts on said arm in operative position,
   (g) one of said parts having slender posts which are sonic-welded to the other part.

9. A slip-on pen cartridge device as defined in claim 8, wherein:
   (a) the slender posts are integral portions of the pen body part.

10. A slip-on pen cartridge device as defined in claim 9, wherein:
    (a) the bridge part has apertures,
    (b) said posts of the pen body part extending into said apertures.

11. A slip-on pen cartridge device as defined in claim 10, wherein:
    (a) the pen body part has a total of four spaced-apart posts,
    (b) said bridge part having four corresponding apertures occupied by the posts.

12. A slip-on pen cartridge device as defined in claim 10, wherein:
    (a) said yieldable retainer means comprises a detent nib on one of the parts, (b) a flat pen arm disposed in the said shallow groove and between the bridge part and the pen body part and having an aperture in which the detent nib is accommodated, (c) said guide means comprising a shallow groove in one part, having side shoulders engageable with the pen arm to guide the latter, and (d) said posts of the pen body part being sonic-welded to the bridge part.

13. A universal slip-on pen cartridge device for attachment to the movable pen arm of chart recorders, comprising in combination:

(a) a molded plastic pen body part containing an ink reservoir and a stylus carried thereby, which latter is adapted for engagement with the paper chart of the recorder, (b) said body part having a hollow neck on which the stylus is carried, and having a supporting surface against which a corresponding flat part of the pen arm of the recorder can bear, (c) a bridge part fabricated as a piece separate from said body part, said bridge part being disposed with a side thereof located opposite to the supporting surface of the body part, (d) one of said parts having guide means in that surface which faces the other part, thereby to provide a tunnel into which the pen arm can be inserted, (e) portions of said body part and bridge part being fused together to retain the bridge part positioned on the body part, and (f) means on one of said parts, cooperable with the pen arm of a chart recorder, for yieldably retaining the fused-together bridge and body parts on said arm in operative position, (g) the yieldable retainer means comprising a detent nib on the pen body part, (h) a flat pen arm disposed in the said guide means and having an aperture in which the detent nib is accommodated, and (i) a ramp disposed on said supporting surface of the pen body part and adjacent to said nib, to minimize the likelihood of the pen arm shearing off the nib as the latter is being received in the aperture of the arm.

14. A slip-on pen cartridge device as defined in claim 13, wherein:

(a) said ramp comprises an annular fillet surrounding said nib, and providing a slide track upon which the pen arm can slide during inserting over the nib.

15. A slip-on pen cartridge device as defined in claim 14, wherein:

(a) said fillet is integral with said nib and said supporting surface.

16. A slip-on pen cartridge device as defined in claim 15, wherein:

(a) said fillet is of generally conical configuration.

* * * * *